(12) United States Patent
Trojanowski (10) Patent No.: US 9,979,172 B2
(45) Date of Patent: May 22, 2018

(54) SCREWLESS AND/OR SEAMLESS COVER PLATE AND COVER PLATE ASSEMBLIES THAT COMPRISE ONE OR MORE RETENTION MEMBERS THAT SELECTIVELY ENGAGE AND SUBSTANTIALLY CONFORM TO THE OUTER SURFACE AND EDGES OF AN ELECTRICAL DEVICE, TO RELEASABLY SECURE THE COVER PLATE TO THE ELECTRICAL DEVICE WITH A BACKING PLATE THEREBETWEEN

(71) Applicant: Joseph Trojanowski, Oak Park, IL (US)

(72) Inventor: Joseph Trojanowski, Oak Park, IL (US)

(*) Notice: Subject to any disclaimer, the term of this patent is extended or adjusted under 35 U.S.C. 154(b) by 0 days. days.

(21) Appl. No.: 15/645,793

(22) Filed: Jul. 10, 2017

(65) Prior Publication Data

US 2017/0310096 A1    Oct. 26, 2017

Related U.S. Application Data

(63) Continuation-in-part of application No. 14/992,788, filed on Jan. 11, 2016, now Pat. No. 9,711,957, which is a continuation-in-part of application No. 14/455,850, filed on Aug. 8, 2014, which is a continuation-in-part of application No. 14/136,646, filed on Dec. 20, 2013, which is a continuation-in-part of application No. 13/745,855, filed on Jan. 20, 2013, now Pat. No. 9,728,947, application No. 15/645,793, filed on Jul. 10, 2017, which is a continuation-in-part of application No. 14/455,850, filed on Aug. 8, 2014, which is a continuation-in-part of application No. 14/136,646, filed on Dec. 20, 2013, which is a (Continued)

(51) Int. Cl.
    *H02G 3/14* (2006.01)

(52) U.S. Cl.
    CPC .................................. *H02G 3/14* (2013.01)

(58) Field of Classification Search
    CPC . H02G 3/081; H02G 3/14; H02G 3/18; F16B 37/043; Y10T 29/49826
    USPC .......... 174/66, 67, 68.1, 480, 481, 502, 503, 174/507, 520; 248/71
    See application file for complete search history.

(56) References Cited

U.S. PATENT DOCUMENTS 4,733,330 A * 3/1988 Tanaka ............... H02G 3/121
                                                 174/58
4,890,418 A * 1/1990 Sachs ................. E04F 19/08
                                                 49/380

(Continued)

*Primary Examiner* — Tremesha S Willis
(74) *Attorney, Agent, or Firm* — Peter B. Scull; Hamilton, DeSanctis & Cha LLP (57) ABSTRACT

Cover plates and cover plate assemblies are provided for electrical fixtures including a screwless cover plate and/or cover plate assembly for electrical devices that cover the fixtures but provide holes for plugs, light switches, audio, data, or video connectors, and that optionally do not show screw or attachment holes, and where the cover plate is part of a cover plate assembly that comprises one or more retention members selectively engage and substantially conform to the outer surface and edges of the electrical device, to releasably secure the cover plate to the electrical device with a backing plate therebetween.

18 Claims, 5 Drawing Sheets

Related U.S. Application Data continuation-in-part of application No. 13/745,855, filed on Jan. 20, 2013, now Pat. No. 9,728,947, application No. 15/645,793, filed on Jul. 10, 2017, which is a continuation-in-part of application No. 14/136,646, filed on Dec. 20, 2013, which is a continuation-in-part of application No. 13/745,855, filed on Jan. 20, 2013, now Pat. No. 9,728,947, application No. 15/645,793, filed on Jul. 10, 2017, which is a continuation-in-part of application No. 13/745,855, filed on Jan. 20, 2013, now Pat. No. 9,728,947, application No. 15/645,793, filed on Jul. 10, 2017, which is a continuation-in-part of application No. 29/548,631, filed on Dec. 15, 2015, now Pat. No. Des. 803,568, which is a continuation of application No. 29/451,111, filed on Mar. 27, 2013, now Pat. No. Des. 745,371.

(60) Provisional application No. 61/694,794, filed on Aug. 30, 2012.

(56) References Cited

U.S. PATENT DOCUMENTS

| | | | | |
|---|---|---|---|---|
| 2009/0193724 A1* | 8/2009 | Struthers | ............... | H02G 3/00 |
| | | | | 52/27 |
| 2010/0267278 A1* | 10/2010 | Gonzalez | ............... | H02G 3/14 |
| | | | | 439/535 |

* cited by examiner

SCREWLESS AND/OR SEAMLESS COVER PLATE AND COVER PLATE ASSEMBLIES THAT COMPRISE ONE OR MORE RETENTION MEMBERS THAT SELECTIVELY ENGAGE AND SUBSTANTIALLY CONFORM TO THE OUTER SURFACE AND EDGES OF AN ELECTRICAL DEVICE, TO RELEASABLY SECURE THE COVER PLATE TO THE ELECTRICAL DEVICE WITH A BACKING PLATE THEREBETWEEN

PRIORITY

This application claims priority to, as a continuation in part (CIP) of each of co-pending U.S. application Ser. No. 13/745,855, filed 2013 Jan. 20; Ser. No. 14/136,646, filed 2013 Dec. 20; Ser. No. 14/455,850, filed 2014 Aug. 8; and Ser. No. 14/992,788 filed 2016 Jan. 11; Ser. No. 14/992,788 being a CIP of each of Ser. Nos. 13/745,855; 14/136,646; and Ser. Nos. 14/455,850; 14/455,850 being a CIP of Ser. No. 13/745,855; and Ser. No. 14/136,646; and Ser. No. 14/136,646 being a CIP of Ser. Nos. 13/745,855; 13/745,855 having been with and claiming direct priority to/from provisional application U.S. No. 61/694,794, filed 2012 Aug. 30; all of the above except 61/694,794 claiming priority to 61/694,794 filed 2012 Aug. 30 via respective chains of priority through Ser. No. 13/745,855, all of which applications being hereby entirely incorporated herein by this reference thereto. This application also claims priority to as a CIP of US Design application 29/548631 filed 2015 Dec. 15 which is a continuation of Ser. No. 29/451,111, filed 2013 Mar. 27, now U.S. Design Pat. No. D745371, both of which are hereby entirely incorporated herein by this reference thereto.

FIELD

The technology described herein relates generally to electrical wiring components, electrical devices, receptacle boxes, cover plates, and cover plate assemblies.

BACKGROUND

Known receptacle box cover plates, or faceplates, are typically constructed in the form of a generally flat plate having one or more openings to provide access to a wired device, or the like, mounted in the receptacle box. The purpose of a cover plate is to provide a decorative cover for the receptacle box installation while also preventing operator exposure to the interior of the receptacle box, which in many instances contains electrical wiring. By way of example, a cover plate can cover a receptacle box containing devices such as ON/OFF switches, outlet receptacles, dimmers, motor speed selector switches, coaxial cable connectors, TV antenna connectors, telephone jacks, computer network cable connectors, informational devices such as clocks, thermometers, security systems, and so forth.

As the number of electrical appliances in the average household grows, the need for convenient access to numerous electrical outlets also grows. Electrical outlet assemblies typically comprise a cover plate, and an electrical outlet having multiple female sockets, or electrical receptacles, where the cover plate is screwed onto the outlet or switch and the screws are visible on the outside surface of the cover plate, and where the cover plate usually has openings that provide for the outlets to extend through the cover plate and are not covered by the cover plate.

Additionally, the use of designer or architectural electrical outlet assemblies and/or cover plates are increasing and alternative types are needed to address this demand, as well as the need to provide cover plates that hide the underlying outlets, receptacle box, gaps, and/or screw or attachment holes or connections.

Accordingly, there is a need to address one or more of such problems or needs.

SUMMARY

Cover plates and cover plate assemblies are provided for electrical fixtures including a screwless cover plate and/or cover plate assembly for electrical devices that cover the fixtures but provide holes for plugs, light switches, audio, data, or video connectors, and that optionally do not show screw or attachment holes, and where the cover plate is part of a cover plate assembly that comprises one or more retention members selectively engage and substantially conform to the outer surface and edges of the electrical device, to releasably secure the cover plate to the electrical device with a backing plate therebetween.

Cover plates are provided for electrical fixtures including a screwless cover plate and cover plate assembly for electrical devices that covers the outlets but provide holes for plugs, light switches, audio, data, or video connectors, and the like, and that do not show screw or attachment holes and where the cover plate is part of a cover plate assembly that have screwless attachment that attaches through a backing plate to the outlet, switch, wall, or housing or receptacle box, without showing screw holes, e.g., via tabs or other attachment mechanisms, with or without a backing plate, and where the cover plate is part of a cover plate assembly that comprises one or more retention members that selectively engage and substantially conform to the outer surface and edges of the electrical outlet or switch, or audio, data, or video plug, cable, or connector, to releasably secure the cover plate sub-assembly thereto, without the need for additional screws or connectors to attach the cover plate to the outlet, light switch, or audio, data, or video connector.

Optionally provided is a cover plate sub-assembly that is configured to be attachable to the at least one electrical device, selected from an outlet, a switch, an audio, data, or video plug, cable, or connector, via at least one mounting connector; the cover plate sub-assembly comprising:
 (i) a cover plate comprising:
  (A) outer edge portions circumscribing a generally planar body portion that lies between the outer edge portions in a first plane and that has a generally planar back surface disposed parallel to the first plane;
  (B) at least one opening in the cover plate that is aligned and sized to allow access to the electrical outlet or switch; and
  (C) one or more retention members disposed adjacent to and fixed to the back surface of the cover plate within the openings in the cover plate that are aligned and sized to allow access to the electrical device via at least one mounting connector; wherein the retention members extend from the cover plate in a second plane substantially perpendicular to the first plane;
 (ii) a backing plate configured to be provided between the cover plate and the electrical device;

wherein:

(1) the one or more retention members selectively engage and substantially conform to at least a portion of an outer surface of an outer edge of the electrical device to releasably secure the cover plate sub-assembly thereto, wherein the outer surface of the outer edge is perpendicular to the first place of the cover plate and the outer surface of the outer edge is adjacent to the cover plate retention members with in the opening of the cover plate;

(2) the body portion of the cover plate, when releasably secured to the electrical device covers the electrical device except for the at least one opening in the cover plate that is aligned and sized to allow access to the electrical device; or insertion of an external electrical, audio, video, or data plug, cable, or connector into the electrical device;

(3) the backing plate is configured to be provided between the cover plate and the electrical device, such that the portions of the electrical device, configured to be accessible through the cover plate, extend through the backing plate, such that one or more of the openings in the cover plate align with the openings or switch provided in the accessible portions of the electrical device; and (4) the backing plate further comprises two or more openings that are configured to be aligned with openings, switches or connectors of the electrical device, such that the backing plate is configured to provide where separate or attached connectors or retention members (e.g., prongs) are configured to be used to attach one or more of:

(a) the backing plate to one or more of the electrical device, a mounting plate, a strapping plate, a receptacle box, and/or a receptacle box cover plate; or (b) the cover plate to both the backing plate and electrical device; or (c) the cover plate to the backing plate, the electrical device, and the mounting plate, strapping plate, receptacle box, or receptacle box cover plate.

The plate assembly can optionally further provide wherein one or more of the retention members of the cover plate include one or more engagement surfaces that interface with one or more surfaces or openings or edges of the electrical outlet or switch, or audio, data, or video plug, cable, or connector.

The plate assembly can optionally further provide wherein one or more of the engagement surfaces of the retention members are at an angle relative to the inner plane of the body surface of the cover plate.

The plate assembly can optionally further provide wherein one or more of the retention members of the cover plate include an arm portion having a first thickness, and an end portion having a second thickness greater than the first thickness; or wherein the cover plate sub-assembly further comprises one or more second retention members that conform to the outer surface and/or edges of the electrical outlet or switch, or audio, data, or video plug, cable, or connector, and that lie in both parallel and perpendicular planes to that of the cover plate back surface.

The plate assembly can optionally further comprise openings in the cover plate to accommodate one or more selected from the group consisting of a light switch, a light dimmer, a light or electricity control panel or touchscreen, or sound, WIFI, or infrared sensors, receivers or transmitters.

The plate assembly can optionally further provide wherein (a) one or more of the electrical outlets or switches, or audio, data, or video connectors are at least one selected from round, rectangular, or square shaped on the surface perpendicular to the outer surface of the cover plate; (b) are separated from each other at the outward facing surfaces or ends, or (c) are combined as a single unit with two or more the electrical outlet or switch, or audio, data, or video plug, cable, or connector with a single rounded, square, or rectangular shaped surface that is perpendicular to the outward surface of the outlet.

The plate assembly can optionally further comprise mounting holes or connectors of mounting or strapping plates that are provided at one or more of the end, side or middle portions of the mounting or strapping plate; and wherein the mounting holes or connectors align with the mounting holes or connectors of the back surface of one or more electrical outlets or switches, or audio, data, or video connectors, or housing or receptacle box.

The plate assembly can optionally further provide wherein the mounting or strapping plate is connected to the electrical outlet or switch, or audio, data, or video plug, cable, or connector, receptacle box, or wall using a screw or connector that also connects the electrical outlet or switch, or audio, data, or video plug, cable, or connector to the receptacle box or wall.

The plate assembly can optionally further provide wherein the planes of the surfaces of the mounting or strapping plate and/or the cover plate are parallel in the range of 0-10 degrees.

The plate assembly can optionally further provide wherein the footprint of the cover plate is larger than that of the strapping plate or receptacle box to cover any gap between the edge of the receptacle box and the adjacent opening in the wall.

The plate assembly can optionally further provide wherein the edge of the cover plate extends between the cover plate and the wall to cover any gap between the cover plate edge and the wall, or for decorative utility.

The plate assembly can optionally further provide wherein a shape of the edge of the cover plate is selected from the group consisting of rounded, curved, angled, concave, convex, raised, stepped, square, beveled, routed, etched, lined, engraved, and any combination thereof.

The plate assembly can optionally further provide wherein the surface of the cover plate is dyed, colored, painted, printed, clear, transparent, clear and back painted, coated or printed, wall papered, rounded, curved, angled, concave, convex, raised, stepped, square, beveled, routed, etched, lined, engraved, and any combination thereof.

The plate assembly can optionally further provide wherein the cover plate further comprises a spring mechanism and hinge to open the cover from the mounting or strapping plate or receptacle box.

The plate assembly can optionally further provide wherein the spring and hinge are provided in a second cover plate provided over the cover plate and attached to one selected from the cover plate, mounting or strapping plate, the housing or receptacle box, and the wall.

The plate assembly can optionally further comprise a mud ring or raised device plate provided between the cover plate and the mounting or strapping plate, wherein said mud plate is of thickness that makes the back of the cover plate flush with the exposed surface of the wall adjacent to the plate assembly when installed.

The plate assembly can optionally further provide wherein the combined thickness of the cover plate and mounting or strapping plate is less than one selected from the group consisting of 3/4, 5/8, 9/16, 1/2, 7/16, 3/8, 5/16, 1/4, 1/8, and 1/16 inches.

Other embodiments of the present disclosure provide electrical outlet or switch, or audio, data, or video plug, cable, or connector, cover plate assemblies that can optionally include an electrical outlet or switch, or audio, data, or video plug, cable, or connector, having at least one electrical receptacle, and a rectangular ring-shaped mounting or strapping plate assembly that is attached to the electrical outlet, housing or receptacle box, or wall, e.g., but not limited to by use of the housing or receptacle box or cover plate screw holes provided in the outlet assembly. In some embodiments, the cover plate assembly includes a rectangular ring-shaped mounting, backing, or strapping plate that is attachable to the electrical outlet, wall, wall covering, or housing or receptacle box, and a cover plate sub-assembly that is selectively attachable to the rectangular ring-shaped mounting or strapping plate without the use of screws. In some embodiments, the cover plate sub-assembly includes a body portion that lies in a first plane, and a first retention member that is fixed to the body portion, and that lies in a second plane parallel to the first plane. The first retention member selectively engages the rectangular ring-shaped mounting or strapping plate to releasably secure the cover plate sub-assembly thereto.

The retention member can include or be selected from at least one of, or one or more of, a snap fitting, an elastic strap or cord, a magnet, a hook and loop fastener (e.g., Velcro™), tape, adhesive, glue, a pressure fitting, a spring fitting, a stretchable tension spring, or any hole, edge, ridge, groove in or bead around the top edge, side edge, bottom edge, or side or bottom, of the receptacle, e.g., but not limited to a corresponding bead, groove, ridge, lip, indentation, and the like, on a hidden or covered side, edge or surface of (e.g., back) of the cover plate to releasably connect, associate, hold, attach, correspond, fasten, stick to at least one of, and/or one or more of, at least a portion, edge, surface, protrusion, hole, indentation, groove, lip, and the like, of one or more, or at least one, of the receptacle, mounting plate, outlet, switch, box, housing, audio, data, or video connector, mud plate, and the like.

The audio, data or video connector can be for any known physical or electronic connection, e.g., but not limited to any audio, data or video connector for cable (ethernet, cable, USB (2.0, 3.0, and the like), or fiber optic cable, RG-6, telephone, video or audio cable or wire, and the like), or for WIFI, infrared, or radio frequency, or other transmitting and/or receiving of audio, data, or video information in any known form, as known in the art.

In still other embodiments, the present disclosure provides a screw or connection hiding cover plate assembly for an electrical outlet or switch, or audio, data, or video plug, cable, or connector, the cover plate assembly including a rectangular ring-shaped mounting or strapping plate that is attachable to the electrical outlet or switch, or audio, data, or video plug, cable, or connector, via the housing or receptacle box attachment or cover plate screw holes, optionally without the use of screws, and that optionally includes a recess defined therein, and a cover plate sub-assembly that is selectively attachable to the rectangular ring-shaped mounting or strapping plate. In some embodiments, the cover plate sub-assembly includes a body portion that lies in a first plane, and that does not have an opening there through for surrounding the outlets or switch, but instead completely covers the outlet except for the plug, light switch, or audio, data, or video connector holes, and a retention member that is fixed to the body portion, that lies in a second plane perpendicular or parallel to the first plane.

The mounting or strapping plate can optionally be connected to the electrical outlet or switch, or audio, data, or video plug, cable, or connector, receptacle box, or wall using a screw or connector that also connects the electrical outlet or switch, or audio, data, or video plug, cable, or connector, to the receptacle box or wall. The planes of the surfaces of the mounting or strapping plate and the cover plate can optionally parallel in any value or range within 1-180 degrees, e.g., but not limited to, 0, 0-5, 0-10, 0-30, 0-40, 0-45, 0-60, 0-90, 0-120, 0-150, 0-160, 10-20, 10-45, 45-90, 90-120, 120-160, 160-180, and the like, degrees.

The shape of the edge of the cover plate can optionally be selected from the group consisting of rounded, curved, angled, concave, convex, raised, stepped, square, beveled, routed, etched, lined, engraved, and any combination thereof. The surface of the cover plate can optionally be painted, dyed, colored, clear, transparent, back painted or dyed, printed with a pattern or image or picture, wall papered, rounded, curved, angled, concave, convex, raised, stepped, square, beveled, routed, etched, lined, engraved, and any combination thereof.

The receptacle or outlet box, outlet, switch, cover plate, mounting or strapping plate, or mud ring, can be any suitable material (e.g., but not limited to, metal, plastic, polymer, wood, injection molded, and the like, or any combination thereof); shape (e.g., but not limited to square, rectangle, round, hexagonal, octagonal, etc., and the like, or any combination thereof); width or height (e.g., but not limited to 1-24 inches or any value or range therein (3.25, 3.5, 4, 4.25, 5, 5.25, 5.5, 6, 7, 7.25, 7.5, 8, 9, 9.25, 9.5, 10, 11, 11.25, 11.5, 12, 15, 15.25, 15.5, 16, inches, and the like); 2-100 cm, or any range or value therein), e.g., but not limited to, 3, 4, 5, 6, 7, 8, 9, 10, and the like), thickness ((e.g., but not limited to 1-24 inches or any value or range therein (3.25, 3.5, 4, 4.25, 5, 5.25, 5.5, 6, 7, 7.25, 7.5, 8, 9, 9.25, 9.5, 10, 11, 11.25, 11.5, 12, 15, 15.25, 15.5, 16, inches, and the like); 2-100 cm, or any range or value therein); as well known in the art, e.g., but not limited to single, double, triple, quadruple outlet or switch, a thickness to accommodate any suitable wall or ceiling joist (e.g., but not limited to 2×3, 2×4, 2×6, 2×8, 2×10, 2×12, 2×16 inches, and the like), or any wall or supporting structure (e.g., but not limited to, masonry, concrete, wood, metal, and the like);

The subject matter hereof can further include a method for using or installing a cover plate assembly, the method comprising:

(A) providing (a) a cover plate sub-assembly that is configured to be attachable to the at least one electrical device, selected from an outlet, a switch, an audio, data, or video plug, cable, or connector, via at least one mounting connector; the cover plate sub-assembly comprising:
  (i) a cover plate comprising:
    (A) outer edge portions circumscribing a generally planar body portion that lies between the outer edge portions in a first plane and that has a generally planar back surface disposed parallel to the first plane;
    (B) at least one opening in the cover plate that is aligned and sized to allow access to the electrical outlet or switch; and
    (C) one or more retention members disposed adjacent to and fixed to the back surface of the cover plate within the openings in the cover plate that are aligned and sized to allow access to the electrical device via at least one mounting connector; wherein the retention members extend from the cover plate in a second plane substantially perpendicular to the first plane;
  (ii) a backing plate configured to be provided between the cover plate and the electrical device;

wherein:

(1) the one or more retention members selectively engage and substantially conform to at least a portion of an outer surface of an outer edge of the electrical device to releasably secure the cover plate sub-assembly thereto, wherein the outer surface of the outer edge is perpendicular to the first place of the cover plate and the outer surface of the outer edge is adjacent to the cover plate retention members with in the opening of the cover plate;

(2) the body portion of the cover plate, when releasably secured to the electrical device covers the electrical device except for the at least one opening in the cover plate that is aligned and sized to allow access to the electrical device; or insertion of an external electrical, audio, video, or data plug, cable, or connector into the electrical device;

(3) the backing plate is configured to be provided between the cover plate and the electrical device, such that the portions of the electrical device, configured to be accessible through the cover plate, extend through the backing plate, such that one or more of the openings in the cover plate align with the openings or switch provided in the accessible portions of the electrical device; and (4) the backing plate further comprises two or more openings that are configured to be aligned with openings, switches or connectors of the electrical device, such that the backing plate is configured to provide where separate or attached connectors or retention members (e.g., prongs) are configured to be used to attach one or more of:

(a) the backing plate to one or more of the electrical device, a mounting plate, a strapping plate, a receptacle box, and/or a receptacle box cover plate; or (b) the cover plate to both the backing plate and electrical device; or (c) the cover plate to the backing plate, the electrical device, and the mounting plate, strapping plate, receptacle box, or receptacle box cover plate; and (B) installing said cover plate assembly by attachment to a receptacle or outlet box, wherein said receptacle or outlet box is attached to one selected from the group consisting of a wall joist, a ceiling joist, a wall, a ceiling, masonry, wood, metal, or concrete.

The edge, tabs, connectors, and/or the like of the retention member optionally selectively engages the rectangular ring-shaped mounting or strapping plate to releasably secure the cover plate sub-assembly thereto.

In various exemplary embodiments, the technology described herein provides a Snap-On, one-piece screwless cover plate, alone, as a cover plate assembly, or in combination with a rectangular ring-shaped mounting, backing or strapping plate, to cover a receptacle box, such as, for example but not limited to, a receptacle box for an electrical outlet or switch, or audio, data, or video plug, cable, or connector, where the cover plate hides any holes, apertures, openings, connectors, tabs, screws or screw holes in one or more of the rectangular ring-shaped mounting, backing, or strapping plate which is optionally attached via use of one or more of the housing or receptacle box, outlet, switch, screw, or other holes, apertures or openings, which optionally include use of the screws or other connectors that are used to attach the outlet or switch to the housing or receptacle box or wall or wall covering.

In various embodiments, a Snap-On, one-piece screwless cover plate, alone, as a cover plate assembly, or in combination with a rectangular ring-shaped mounting, backing or strapping plate, for electrical devices is disclosed. The cover plate assembly can include a Snap-On, one piece, screwless cover plate and cover plate assembly for a receptacle box that is capable of being installed directly to an electrical device that is installed in the receptacle box via a rectangular ring-shaped mounting or strapping plate that can be attached using existing holes or openings or screw holes provided in the outlet or switch that can optionally include the use of the holes and screws used to attach the outlet or switch to the housing or receptacle box.

In various embodiments, the securing mechanism and/or retention members for or of the cover plate, alone, as a cover plate assembly, or in combination with a rectangular ring-shaped mounting, backing or strapping plate, can be in the form of one or more protrusions, prongs, or other structural members (hereinafter referred to generally as "prongs"), each integrally formed or otherwise connected or associated with the cover plate. The prongs integrally formed or attached with the cover plate provide a means of attachment or fastening to any electrical device that is mounted into the receptacle box, including, but without limitation, an electrical outlet, light switch, oven plug, cable or phone connection, stereo, etc.

In one optional embodiment, the Snap-On, one-piece screwless cover plate, alone, as a cover plate assembly, or in combination with a rectangular ring-shaped mounting, backing or strapping plate, includes prongs disposed on the cover plate in a manner in which the cover plate is secured optionally via a rectangular ring-shaped mounting or strapping plate to the electrical device in an end, middle, side or center attachment area, or any combination thereof.

In one optional embodiment, the Snap-On, one-piece screwless cover plate, alone, as a cover plate assembly, or in combination with a rectangular ring-shaped mounting, backing or strapping plate, alone, as a cover plate assembly, or in combination with a rectangular ring-shaped mounting, backing or strapping plate, includes prongs, tabs, or connectors no visible from the outside and disposed on the back side of cover plate in a manner in which the cover plate is secured to the electrical device in an attachment area going into one, two, three, four, five, six, seven, eight, nine, or ten existing or punch out or available existing or new holes of the electrical device, located above, between, to the side, below, in the middle, in the center, in the periphery, or any combination thereof, the electrical device, e.g., but not limited to one or more outlets, switches, or any combination thereof, where the cover plate can cover the outlet except for the plug holes, apertures, or openings.

As will be apparent to one of ordinary skill in the art, after reading the disclosure contained herein, there are numerous optional configurations of the locations of the prongs and the shape or size of the prongs which can provide further options to accommodate various devices. Additionally, optional configurations can include 1-gang, 2-gang, 3-gang, and so forth, arrangements. In one optional embodiment, the Snap-On, one-piece screwless cover plate and/or cover plate assembly is manufactured of a biodegradable material. In one optional embodiment, the Snap-On, one-piece screwless cover plate, alone, as a cover plate assembly, or in combination with a rectangular ring-shaped mounting, backing or strapping plate is manufactured of an anti-bacterial material. In one optional embodiment, the snap-on, one-piece screwless cover plate, alone, as a cover plate assembly, or in combination with a rectangular ring-shaped mounting, backing or strapping plate, also includes an insulation portion in order to eliminate the need for separate foam insulation cutouts to go underneath a cover plate. In one optional embodiment, the snap-on, one-piece screwless cover plate, alone, as a cover plate assembly, or in combination with a rectangular ring-shaped mounting, backing or strapping plate, can be made of a plastic material having a coating that makes the cover plate to appear to be made of metal. The type of plastic used in any of the embodiments can vary according to its end use. By way of example, the plastic can be nylon, ABS, etc., or any combination of more than one type of plastic.

In one optional embodiment, the snap-on, one-piece screwless cover plate, alone, as a cover plate assembly, or in combination with a rectangular ring-shaped mounting, backing or strapping plate, also includes one or more support ribs, the location of which can vary according to the electrical device to which it is attached. The ribs also may be left off entirely if the strength of the plastic is determined to be sufficient.

Advantageously, the snap-on, one-piece screwless cover plate, alone, as a cover plate assembly, or in combination with a rectangular ring-shaped mounting, backing or strapping plate, provides easy installation and/or removal, without the use of tools, and sustained coverage of a receptacle box without the need for or use of screws, including those used in known devices through holes in the cover plate or in a separate device that intervenes between the electrical device and the cover plate. The latter such devices appear to be screwless on the face of the cover plate, but actually use screws or other connectors on the intervening device to connect the intervening device to the electrical device. The technology disclosed herein optionally uses no such intervening device. Additionally, utilizing a cover plate, alone, as a cover plate assembly, or in combination with a rectangular ring-shaped mounting, backing or strapping plate, without screws ensures that no mismatch of color between screws and the cover plate exists.

Also advantageously, the snap-on, one-piece screwless cover plate, alone, as a cover plate assembly, or in combination with a rectangular ring-shaped mounting, backing or strapping plate, provides a solution in which no new receptacle box is required. The snap-on, one-piece screwless cover plate, alone, as a cover plate assembly, or in combination with a rectangular ring-shaped mounting, backing or strapping plate, can be distributed new with a receptacle box assembly, an electrical device assembly, or, alternatively, can be distributed individually to be utilized upon an existing receptacle box. In each of the disclosed embodiments, the snap-on, one-piece screwless cover plate and/or cover plate assembly can optionally require no or minor modification by the manufacturer of the existing electrical devices or receptacle boxes to make them work.

Further advantageously, the snap-on, one-piece screwless cover plate, alone, as a cover plate assembly, or in combination with a rectangular ring-shaped mounting, backing or strapping plate, provides a solution in which time, labor, and expenses are saved due to the ease of use and installation and/or removal without screws and tools. Manufacturing and packaging costs are also lessened due to the elimination of the screws, painting of the screws, separate packaging of the screws, elimination of shipping of the screws to the cover plate manufacturer, and elimination of any intervening devices. Use of the snap-on, one-piece screwless cover plate, alone, as a cover plate assembly, or in combination with a rectangular ring-shaped mounting, backing or strapping plate, also saves the environment with its use of fewer parts, less packaging, and the elimination of painting of the screws.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining one optional embodiment of the technology in detail, it is to be understood that the inventions hereof are not limited in application to the details of construction and to the arrangements of, and the shape and size of, the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present inventions. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which.

DETAILED DESCRIPTION

Before describing the disclosed embodiments of this technology in detail, it is to be understood that the technology is not limited in its application to the details of the particular arrangements shown here since the technology described is capable of other embodiments. Also, the terminology used herein is for the purpose of description and not of limitation.

In various exemplary embodiments, the technology described herein provides a screwless cover plate, alone, as a cover plate assembly, or in combination with a rectangular ring-shaped mounting, backing or strapping plate, to attach any on electrical receptacle, mounting plate, wall, receptacle box, or receptacle box cover plate to cover a receptacle box, such as, for example but not limited to, a receptacle box for an electrical outlet or switch, or audio, data, or video plug, cable, or connector, where the cover plate is part of a cover plate assembly that comprises one or more retention members that selectively engage and substantially conform to the outer surface and edges of the electrical outlet or switch, or audio, data, or video plug, cable, or connector, to releasably secure the cover plate sub-assembly thereto, without the need for additional screws or connectors to attach the cover plate to the outlet, light switch, or audio, data, or video connector.

Cover plates are provided for electrical fixtures including a screwless cover plate and/or cover plate assembly for electrical devices that covers the outlets but provide holes for plugs, light switches, audio, data, or video connectors, and the like, and that do not show screw or attachment holes, and optionally where the cover plate is part of a cover plate assembly that have screwless attachment to a rectangular ring-shaped mounting or strapping plate that attaches through a backing plate to the outlet, switch, wall, or housing or receptacle box without showing screw holes, e.g., via tabs or other attachment mechanisms, with or without a backing plate.

FIGS. 1-5 illustrate non-limiting examples of embodiments of the inventions/present disclosure.

Figure 1:
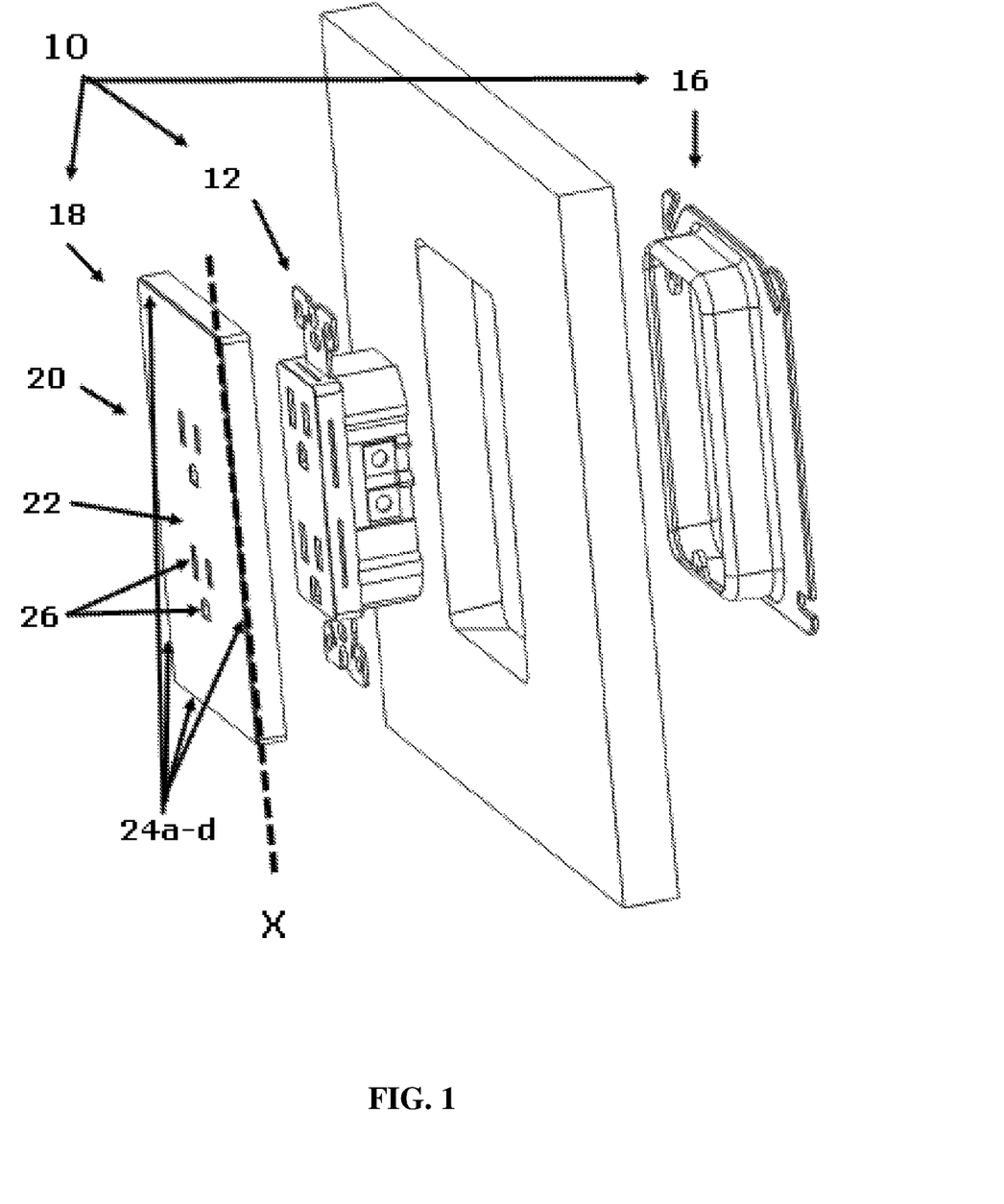
FIG. 1 is a perspective, exploded view of components of a non-limiting example of an electrical outlet or switch, or audio, data, or video plug, cable, or connector, assembly in accordance with the present disclosure.

FIG. 1 illustrates in an exploded perspective view an embodiment of electrical outlet or switch, or audio, data, or video plug, cable, or connector, assembly 10 in accordance with the present disclosure. The electrical outlet assembly 10 includes an electrical receptacle 12; a rectangular ring-shaped mounting or strapping plate 16 and a cover plate sub-assembly 18. As discussed in further detail herein, the rectangular ring-shaped mounting or strapping plate 16 can be secured to the electrical outlet 12 and the cover plate sub-assembly 18 can be releasably secured to the outlet 12.

With particular reference to FIG. 1, the cover plate sub-assembly 18 includes a cover plate 20 having a generally planar body portion 22 and edge portions 24a, 24b, 24c, 24d about the perimeter thereof. The body portion 22 generally lies within a first plane that is designated as plane X, and includes one or more plug openings 26 there through.

As described in further detail below, the plug openings 26 enable the cover plate sub-assembly 18 to mount to the outer or front surface of the outlet 12 to cover the outlet except for the plug holes, and also enable access to electrical receptacle(s) of the electrical outlet 12. Although the openings 26 are illustrated as round or slit openings, it is appreciated that the shape of the openings 26 can vary. Other exemplary shapes include, but are not limited to, square, oval, and/or rectangular, or any combination thereof. The openings 26 in the cover plate 20 can optionally be provided to hide one or more of the edges 24a-24d of the cover plate 20 can be chamfered or rounded to extend out of the plane X, or any other shape, e.g., to optionally cover the gap between the receptacle box or mounting or mud plate and the wall opening. In this manner, the edges 24a-24d form reinforcing and/or covering features, e.g., but not limited to, optionally to increase the rigidity and strength of the cover plate 20, to provide sufficient strength and stiffness to resist breakage during mounting, and to resist peel-back at the corners.

The cover plate 20 is optionally made from a dielectric, or electrically insulating, material. Exemplar materials include, but are not limited to, urea polymers, thermoplastic polymers such as nylons, polyesters, particularly polyethylene terphthalate (PET), polyester containing copolymers such as PET copolymers, polyolefins, ethylene vinyl alcohol copolymers, acrylonitrile copolymers, acrylic polymers, vinyl polymers, polycarbonate, polystyrene, polyurethanes, and combinations thereof. Other materials can include polyvinyl chloride (PVC), as well as resins containing high impact amorphous polycarbonate (PC) and acrylonitrile-butadiene-styrene (ABS) terpolymer blends, such as Cycoloy® CY6120 from GE Plastics. The cover plate 20 is optionally made from an electrically insulating, non-metallic material that meets relevant industry standards. The material can optionally include one or more additives that can enhance the processing of the material, and improve the quality and characteristics of the cover plate 20. Exemplar materials include, but are not limited to, oxidative and thermal stabilizers, lubricants, mold release agents, flame-retarding agents, oxidation inhibitors, dyes, pigments and other coloring agents, ultraviolet light stabilizers, organic or inorganic fillers including particulate and fibrous fillers, reinforcing agents, nucleators and/or plasticizers. Such additives can be provided in various amounts including, but not limited to, amounts of up to approximately 10% by weight of the overall composition. The cover plate 20 may be formed using various processes. Exemplar processes include, but are not limited to, thermoforming, blow molding and injection molding.

Figure 2:
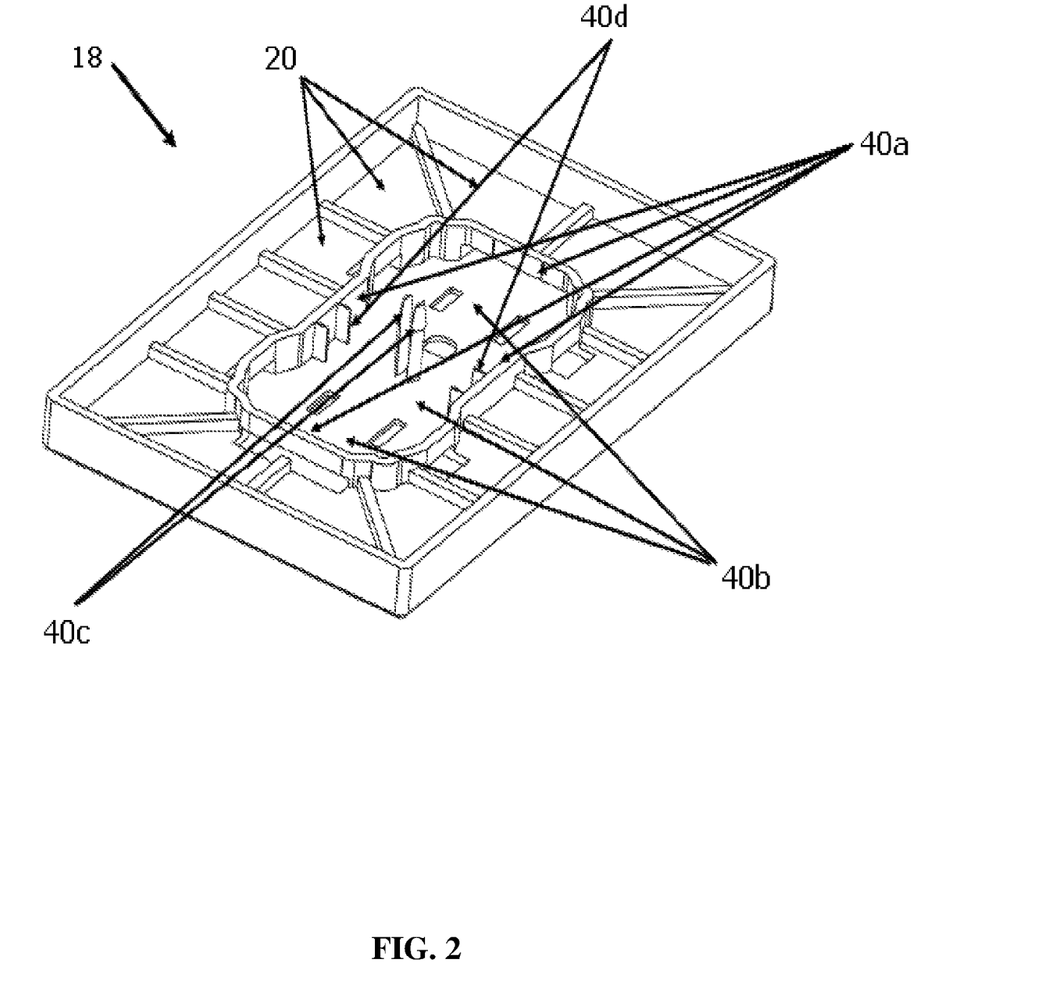
FIG. 2 is a perspective, exploded view of components of a non-limiting example of an electrical outlet assembly in accordance with the present disclosure.
Figure 3:
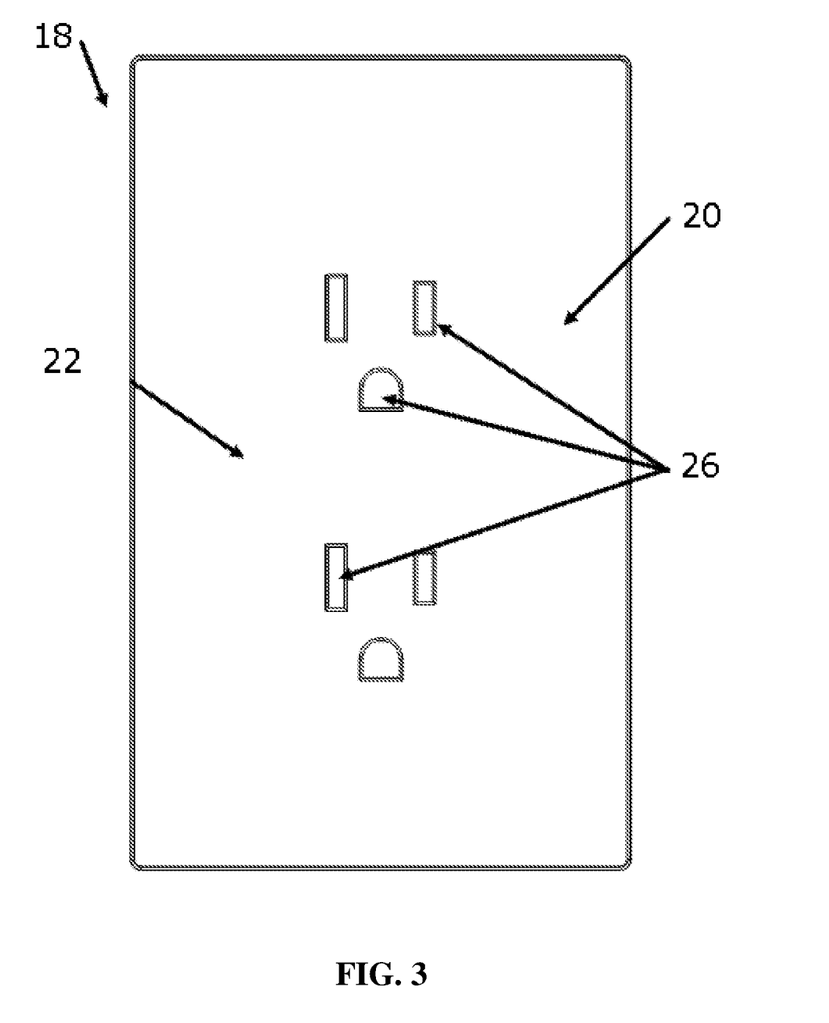
FIG. 3 is a front view of a non-limiting example of a face plate cover and wall as viewed after installation in accordance with the present disclosure.
Figure 4:
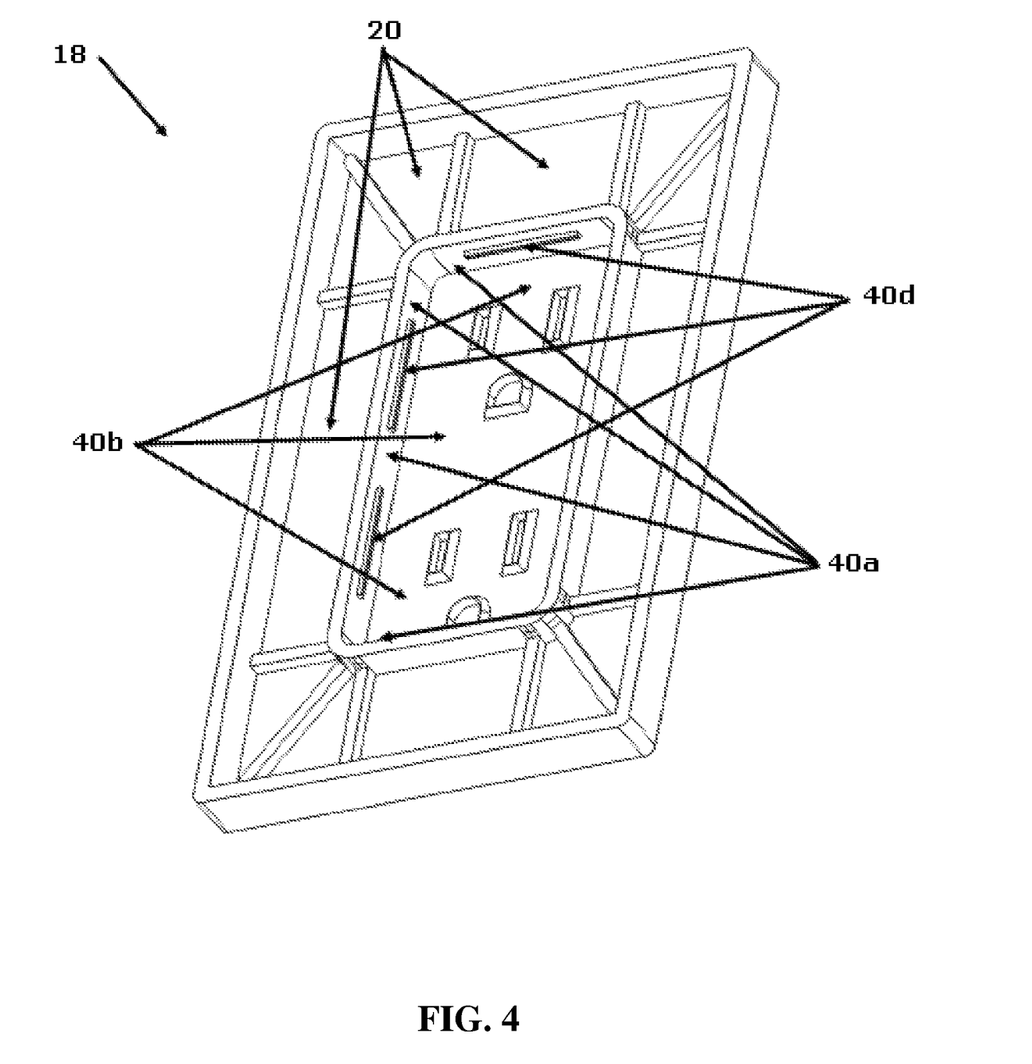
FIG. 4 is perspective view of components of the back side of a non-limiting example of a cover plate with attachment points and other features; and, FIG. 5 is a perspective, exploded view of components of a non-limiting example of a backing plate provided between a cover plate and an electrical outlet, assembly in accordance with the present disclosure.

Referring now to FIGS. 2 and 4, retention members 40A, 40B, 40C and/or 40D are provided to releasably attach the cover plate and/or the cover plate assembly to one or more of an electrical outlet, an electrical switch, and/or a video, audio, and/or data connector or outlet are secured to the back surface of the cover plate 20 of the cover plate assembly 18. Non-limiting examples include at least one or at least a portion of an inner back surface of a retention member 40B of the cover plate 20; at least one or at least a portion of an inside outer edge of a retention member 40A of the cover plate 20; at least one or at least one portion of a projection/optionally locking retention member 40C attached to one or more of the inside surface of the cover plate 20; and/or at least one or at least a portion of a retention member 40D comprising one or more of an inner extending flexible or engaging member. Each of the optional retention members 40A, 40B, 40C, and/or 40D can be configured to releasable hold, contribute to the releasable holding of, the cover plate and/or cover plate assembly to one or more of an electrical outlet, an electrical switch, and/or a video, audio, and/or data plug, cable, or connector or outlet are secured to the back surface of the cover plate 20 of the cover plate assembly 18.

Although various retention members 40A, 40B, 40C, and/or 40D are illustrated, it is appreciated that the cover plate sub-assembly 18 can include more or fewer retention members 40A, 40B, 40C and/or 40D. An embodiment having a single retention member 40, for example, is within the scope of the present disclosure. The retention members 40 are secured to the back surface using any one of various fastening techniques. An exemplar fastening technique includes heat staking. For example, the cover plate 20 can include one or more retention members 40A, 40B, 40C and/or 40D extending therefrom, generally perpendicular to the plane X. Other fastening means can be implemented in alternative embodiments. For example, a fastening member (not shown), such as a screw, can be used to secure the retention members 40 to the cover plate 20. The retention members 40A, 40B, 40C and/or 40D are secured adjacent to the cover plate 20 and generally lie within a second plane.

Referring again to FIGS. 1-5, one or more of the retention members 40A, 40B, 40C and/or 40D are mounted to the back surface of the cover plate (20) such that the ends extend into the openings of the an electrical outlet, an electrical switch, and/or a video, audio, and/or data plug, cable, or connector or outlet, or mounting or strapping plate 16.

The retention members 40 can be made from a number of materials. In one embodiment, the retention members 40 are made from a metallic material. Exemplar metallic materials include, but are not limited to, carbon steels, alloy steels, corrosion resisting steels, phosphor bronze, spring brass, beryllium copper, nickel alloy steels, titanium alloy steels and/or combinations thereof. The retention members 40 can be formed using one or more processes including, but not limited to, stamping.

In an alternative embodiment, the retention members 40 are made from a dielectric, or electrically insulating material that can include, but is not limited to, urea polymers, thermoplastic polymers such as nylons, polyesters, particularly polyethylene terephthalate (PET), polyester containing copolymers such as PET copolymers, polyolefins, ethylene vinyl alcohol copolymers, acrylonitrile copolymers, acrylic polymers, vinyl polymers, polycarbonate, polystyrene, polyurethanes and combinations thereof. Other materials can include polyvinyl chloride (PVC), as well as resins containing high impact amorphous polycarbonate (PC) and acrylonitrile-butadiene-styrene (ABS) terpolymer blends, such as Cycoloy® CY6120 from GE Plastics. In this alternative embodiment, the retention members 40 are optionally made from an electrically insulating, non-metallic material that meets relevant industry standards. The material can optionally include one or more additives that can enhance the processing of the material, and improve the quality and characteristics of the retention members 40, such as one or more of 40A-40D FIGS. 2 and 4. Exemplary materials include, but are not limited to, oxidative and thermal stabilizers, lubricants, mold release agents, flame-retarding agents, oxidation inhibitors, dyes, pigments and other coloring agents, ultraviolet light stabilizers, organic or inorganic fillers including particulate and fibrous fillers, reinforcing agents, nucleators and/or plasticizers. Such additives can be provided in various amounts including, but not limited to, amounts of up to approximately 10% by weight of the overall composition. The retention members 40 may be formed using various processes. Exemplar processes include, but are not limited to, thermoforming, blow molding and injection molding. In one embodiment, the retention members 40A-D can be integrally formed with the cover plate 20 during a forming process.

The rectangular ring-shaped mounting or strapping plate 16 can be selectively, replaceably, and/or temporarily attached or permanently attached to the an electrical outlet, an electrical switch, and/or a video, audio, and/or data plug, cable, or connector or outlet 12, wall, additional mounting plate, receptacle box, or receptacle box cover plate. In one embodiment, the rectangular ring-shaped mounting or strapping plate 16 can be selectively, replaceably, and/or temporarily attached to the electrical outlet 12, wall, additional mounting plate, receptacle box, or receptacle box cover plate, using fastening means including, but not limited to, screws (not shown). For example, the fastening means can be received, through openings in the rectangular ring-shaped mounting or strapping plate 16 and can be received into corresponding openings of the electrical outlet 12 to secure the rectangular ring-shaped mounting or strapping plate 16 thereto. In alternative embodiments, the rectangular ring-shaped mounting or strapping plate 16 can be permanently attached to the electrical outlet 12, wall, additional mounting plate, receptacle box, or receptacle box cover plate using fastening means including, but not limited to, rivets (not shown). For example, the rivets can be received through openings in the rectangular ring-shaped mounting or strapping plate 16 and can be received into corresponding openings of the electrical outlet 12, wall, additional mounting plate, receptacle box, or receptacle box cover plate. The rivet can be deformed, or upset, to secure the rectangular ring-shaped mounting or strapping plate 16 to the electrical outlet 12, wall, additional mounting plate, receptacle box, or receptacle box cover plate.

The rectangular ring-shaped mounting or strapping plate 16 is optionally made from a dielectric, or electrically insulating, material. Exemplar materials include, but are not limited to, urea polymers, thermoplastic polymers such as nylons, polyesters, particularly polyethylene terephthalate (PET), polyester containing copolymers such as PET copolymers, polyolefins, ethylene vinyl alcohol copolymers, acrylonitrile copolymers, acrylic polymers, vinyl polymers, polycarbonate, polystyrene, polyurethanes and combinations thereof. Other materials can include polyvinyl chloride (PVC), as well as resins containing high impact amorphous polycarbonate (PC) and acrylonitrile-butadiene-styrene (ABS) terpolymer blends, such as Cycoloy® CY6120 from GE Plastics. The rectangular ring-shaped mounting or strapping plate 16 is optionally made from an electrically insulating, non-metallic material that meets relevant industry standards.

The material can optionally include one or more additives that can enhance the processing of the material, and improve the quality and characteristics of the rectangular ring-shaped mounting or strapping plate 16. Exemplar materials include, but are not limited to, oxidative and thermal stabilizers lubricants, mold release agents, flame-retarding agents, oxidation inhibitors, dyes, pigments and other coloring agents, ultraviolet light stabilizers, organic or inorganic fillers including particulate and fibrous fillers, reinforcing agents, nucleators and/or plasticizers. Such additives can be provided in various amounts including, but not limited to, amounts of up to approximately 10% by weight of the overall composition. The rectangular ring-shaped mounting or strapping plate 16 may be formed using various processes. Exemplar processes include, but are not limited to, thermoforming, blow molding and injection molding.

The amount of force required to disengage the cover plate or sub-assembly 18 from the electrical outlet or switch, or audio, data, or video connector 12 can optionally be based on the design or number of retention members 40A-D.

For example, less force may be required to disengage a cover plate 20 or sub-assembly 18 having a single retention member 40C FIGS. 2 and 4 than one having multiple retention members, but can optionally be used to facilitate attachment and removal.

The amount of force required to disengage the cover plate or sub-assembly 18 from the electrical outlet or switch, or audio, data, or video connector 12 can further be based on the characteristics of the retention member 40. More specifically, sections of the retention member can be thinner, or thicker to respectively decrease, or increase the spring constant of the retention member.

Referring again to FIGS. 1-5, the electrical outlet or switch, or audio, data, or video connector can include any one of various electrical outlets or switches, or audio, data, or video connectors known in the industry and can include, but is not limited to, a single gang (SG) outlet, a double gang (DG) outlet, any multi-gang outlet, a duplex outlet, and a multi-duplex outlet.

In one embodiment, the electrical outlet 12 can include a reorientable electrical outlet such as those disclosed in U.S. patent application Ser. No. 11/302,924 to Kimberly R. Gerard, which was filed on Dec. 14, 2005, and the disclosure of which is expressly incorporated herein by reference in its entirety. An exemplar reorientable electrical outlet, such as those disclosed in commonly assigned U.S. patent application Ser. No. 11/302,924, can include an electrical receptacle that is rotatably disposed in a housing or receptacle box. In the case of the electrical outlet 12, the electrical receptacles 92 can be rotatably supported by the body 90 to be rotatable about respective axes A. It is also contemplated that the electrical outlet 12 can include a ground fault interrupt (GFI) outlet having a ground fault circuit interrupter (GFCI). The GFCI can include, for example, reset or test buttons, and may be implemented in combination with the embodiments described herein.

Components of the electrical outlet or switch, or audio, data, or video connector are optionally formed of nonconductive material such as plastic or polyvinyl chloride (PVC). The nonconductive components may also be formed of nylon or any other suitable supporting material. In some embodiments, the electrical outlet 12 may be manufactured using resins containing high impact amorphous polycarbonate (PC) and acrylonitrile-butadiene-styrene (ABS) terpolymer blends, such as Cycoloy® CY6120 from GE Plastics. By varying the ratio of PC to ABS in the resin, the electrical outlet 12 may be tailored for residential or industrial use. Further, the overall cost of the electrical outlet 12 may be reduced by employing regrind, or powdering, techniques. Optionally, no more than 15% regrind is employed.

The securing mechanism and/or retention members for or of the cover plate, alone, as a cover plate assembly, or in combination with a rectangular ring-shaped mounting plate, backing plate or strapping plate, can be in the form of one or more protrusions, prongs, or other structural members (hereinafter referred to generally as "prongs"), each integrally formed or otherwise connected or associated with the cover plate. The prongs are optionally integrally formed or attached with the cover plate and provide a means of attachment or fastening to any electrical device that is mounted into the receptacle box, including, but without limitation, an electrical outlet, light switch, oven plug, cable or phone connection, stereo, and the like.

Various prong configurations as one or more securing mechanisms and/or retention members can be utilized, e.g., 40C FIGS. 2 and 4. The prongs, located on the rear side of the cover plate, for example, are optionally molded into, or otherwise integrally formed with, the cover plate. The prongs can optionally removably fit into and/or attach to at least 1, 2, 3, or 4 of openings provided in any electrical device that is mounted into the receptacle box, including, but without limitation, an electrical outlet, light switch, oven plug, cable or phone connection, stereo, and the like.

Figure 5:
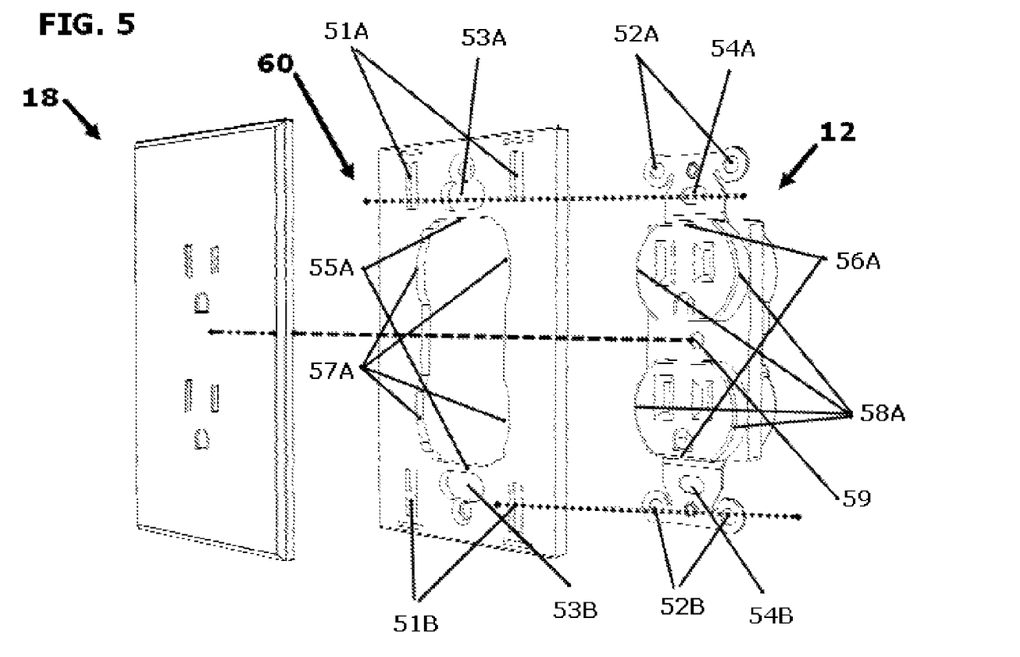

As a non-limiting example, 1, 2, 3, 4, or more prongs attached to the rear side of the cover plate that are configured to be inserted into or through one or more openings in the outer surface of an electrical device, e.g., and outlet, e.g., optionally including one or more of openings or threaded openings 52A, 52B, 54A, 54B, or 59 provided in the outer surface of an electrical outlet as shown in FIG. 5.

Optionally the one or more prongs are configured to be removably inserted into, and removably attached to, one or more of openings or threaded openings 52A, 52B, 54A, 54B, or 59 of the outlet as shown in FIG. 5.

Optionally the one or more prongs are configured to be removably inserted into, and removably attached to, one or more of openings or threaded openings 52A, 52B, 54A, 54B, or 59 as shown in FIG. 5; and can optionally further include where the prongs are configured to be removably attached to one or more openings or threaded openings in one or more of at least one mounting plate, strapping plate, backing plate, receptacle box, and/or a receptacle box cover plate, which optionally can include where the one or more prongs, in addition to being configured to attach the cover plate to the outlet, also are configured to attach the outlet to at least one mounting plate, strapping plate, backing plate, receptacle box, and/or a receptacle box cover plate.

Optionally the cover plate comprises one or more prongs that are configured to be removably inserted into, and removably attached to, one or more of openings or threaded openings of one or more electrical devices, including, but without limitation, an electrical outlet, light switch, oven plug, cable or phone connection, stereo, and the like; and the prongs are further configured to provide removable attachment to one or more openings or threaded openings in one or more of at least one mounting plate, strapping plate, backing plate, receptacle box, and/or a receptacle box cover plate, which optionally can include where the one or more prongs are configured to attach the at least one mounting plate, strapping plate, backing plate, receptacle box, and/or a receptacle box cover plate the electrical device.

In a further non-limiting embodiment, a backing plate is provided between the cover plate and the electrical device, such that the portion of the electrical device configured to be accessible through the cover plate, extends through the backing plate, such that one or more of the openings in the cover plate align with the openings or switch provided in the portion of the electrical device that is accessible through the cover plate. In this embodiment, the backing plate optionally further comprises two or more openings that are configured to be aligned with openings, switches or connectors of the electrical device, such that the backing plate is configured to provide where separate or attached connectors or retention members (e.g., prongs) are configured to be used to attach one or more of:

(a) the backing plate to one or more of the electrical device, a mounting plate, a strapping plate, a receptacle box, and/or a receptacle box cover plate; and/or (b) the cover plate to both the backing plate and electrical device; and/or (c) the cover plate to the backing plate, the electrical device, and the mounting plate, strapping plate, receptacle box, or receptacle box cover plate.

In a further non-limiting embodiment as shown in FIG. 5, a backing plate 60 is provided between the cover plate 18 and the electrical device as outlet 12, such that the portions of the outlet 12 (as within top and bottom outer edges 56A and side outer edges 58A) are configured to be accessible through the holes in the cover plate 18. These portions of the outlet (12) extend through the backing plate 60 between the upper 55A and side 57a edges of the opening in the backing plate 60, as shown in FIG. 5, such that one or more of the openings in the cover plate 12 align with the openings provided in this portion of the outlet 12 that is accessable through the cover plate 18.

In this embodiment, as shown in FIG. 5, the backing plate 60 optionally further comprises two or more of openings 51A, 51B, 53A, 53B that are configured to be aligned, respectively, with two or more of openings 52A, 52GB, 54A, 54B or 59 of the electrical device as the outlet (e.g., but not limited to, the dotted lines in FIG. 5), such that the backing plate 60 is configured to provide where separate or attached connectors or retention members (e.g., prongs) are configured to be used to attach one or more of:

(a) the backing plate 60 to one or more of: the electrical device 12, a mounting plate, a strapping plate, a receptacle box, and/or a receptacle box cover plate (not shown in FIG. 5);

(b) the cover plate 18 to both: the backing plate 60 and the electrical device as the outlet 12; and/or (c) the cover plate 18 to: the backing plate 60, the electrical device 12, and the mounting plate, strapping plate, receptacle box, or receptacle box cover plate (not shown).

As another non-limiting example, a prong attached to the center of the back side of the cover plate 18 is configured to attach the cover plate 18 to both: the backing plate 60 and the outlet 12, where the prong is configured to pass through the central opening in the backing plate 60 (between edges 55A and 57A) and attach to the central opening 59 in the outlet 12, as shown in FIG. 5 by the dashed line.

The prongs can optionally be generally perpendicular or at a slight angle to the cover plate. This configuration enables the cover plate to snap into, onto, or around an electrical device that is attached to the electrical outlet or switch, or audio, data, or video connector 18, for example. The location of the prongs on the cover plate will vary according to which electrical device is connected to the receptacle box. With any electrical device, the locations, shape, and size of the prongs are not limited only to those shown in the Figures.

The prongs as one or more of one more types of retention members can optionally utilize a friction fit, a hooking type of fit, or snap into an existing hole(s) to enable the cover plate to snap onto the electrical device. The prongs can snap into, onto, or around whatever electrical device is used. Examples of prong locations, shapes and sizes of prongs, attachment areas, and electrical devices include, but are not limited to, those depicted in the Figures.

A cover plate having one or more retention members for one or more of at least one middle, outer, or center attachment area on electrical outlet or switch, or audio, data, or video connector, mounting plate, wall, receptacle box, or receptacle box cover plate, where a friction fit is formed when the retention members are placed directly adjacent to the attachment areas on the at least one electrical outlet or switch, or audio, data, or video connector that make up the electrical device. The retention members in this embodiment can optionally provide an outward tension that pushes against the center attachment areas to hold the cover plate securely in place. The cover plate can include an optional slot for ease in removal of the cover plate. The slot provides a grip by which the cover plate can be pulled and removed with or without the use of a screwdriver or other tool. The location of the slot on any of the embodiments can be on either side or the top or bottom of the cover plate, can be on one, two, three, or four sides, or can be omitted altogether. The size of slot can vary according to need.

A cover plate having a single prong for a center hole attachment area on electrical device can also be optionally used. A friction fit or snap fit is formed when single prong is placed in center hole attachment area of the electrical device. The single prong in this embodiment provides a tension in the center hole, or the like, of an on electrical receptacle, mounting plate, wall, receptacle box, or receptacle box cover plate. The cover plate can include one or more slots for ease in removal of the cover plate, if so desired. The cover plate also can include one or more safety stops, if so desired, to prevent a screwdriver or other devices from penetrating into the area through slot, where an electrical shock could occur when contact is made with certain areas of the electrical device. A reinforcing platform can be a variety of shapes and sizes to accommodate the particular prong and electrical device into which the prong will be inserted. The single prong can vary in shape and size depending on the specific application. By way of example, the shape of the prong can include threads or fins.

In one optional embodiment, the snap-on, one-piece screwless cover plate 10 includes retention members disposed on the cover plate 10 in a manner in which the cover plate 10 is secured to the electrical device 12 in an attachment area going into two existing holes of the electrical device 12, one located above and one located below the electrical device. The shape of the retention members can vary depending on the specific application. By way of example, the shape of the retention members can include threads or slots. The shape of the opening can vary according to the on electrical receptacle, mounting plate, wall, receptacle box, or receptacle box cover plate to which it is attached. In this embodiment, the opening can accommodate a larger switch such as a light switch, dimmer switch, or the like.

A cover plate can also be provided having retention members for a light switch attachment area, or the like. In this optional embodiment, the retention members include a channel. The channel aids in providing a tension to the device. As the cover plate is inserted, the retention members are able to be depressed slightly to enter holes. This provides additional tension to secure the cover plate to the electrical device to which it is attached. A cover plate for a light switch, or the like, can optionally provide a friction fit or snap fit formed when retention members are attached to the side of the electrical light switch in the receptacle box. The width of the space between the retention members can vary according to the type of light switch or electrical device to which it is attached. The locations of the retention members can be duplicated and adjusted for 1-gang, 2-gang, etc. configurations. The shape of the opening between retention members can vary according to the type of device to which the cover plate is attached. By way of example, the shape of the opening can be rectangular, round, etc., according to the electrical device to which it is attached.

As will be apparent to one of ordinary skill in the art, after reading the disclosure contained herein, there are numerous optional configurations of the locations of the retention members and the shape, size, and configuration of the retention members, as well as openings, which can provide further options to accommodate various devices.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the inventions hereof and are intended to be covered by the following claims.

What is claimed is:

1. A cover plate assembly for an electrical device, the cover plate assembly comprising:
   (a) a cover plate sub-assembly that is configured to be attachable to the electrical device, the electrical device selected from an electrical outlet, an electrical switch, an audio, data, or video plug, cable, or connector, the cover plate sub-assembly attachable to the electrical device via at least one mounting connector;
   the cover plate sub-assembly comprising:
      (i) a cover plate comprising:
         (A) outer edge portions circumscribing a generally planar body portion that lies between the outer edge portions in a first plane and that has a generally planar back surface and a generally planar front surface, each disposed parallel to the first plane;
(B) at least one access opening in the cover plate that is aligned and sized to allow access to accessible portions of the electrical device through the cover plate; and
(C) one or more retention members disposed adjacent to and fixed to the back surface of the cover plate; wherein the one or more retention members extend from the cover plate in a second plane substantially perpendicular to the first plane;
(ii) a backing plate configured to be provided between the cover plate and the electrical device;

wherein:
(1) the one or more retention members are configured to selectively engage and substantially conform to at least a portion of an outer surface of an outer edge of the electrical device to releasably secure the cover plate sub-assembly thereto, wherein the outer surface of the outer edge of the electrical device is perpendicular to the first plane of the cover plate and the outer surface of the outer edge is adjacent to the one or more retention members of the cover plate;
(2) the generally planar body portion of the cover plate, when releasably secured to the electrical device, covers the electrical device except for the at least one access opening in the cover plate, wherein the at least one access opening is aligned and sized to be configured to provide for insertion of an external electrical, audio, video, or data plug, cable, or connector into the accessible portions of the electrical device;
(3) the backing plate is configured to be provided between the cover plate and the electrical device, such that the portions of the electrical device, configured to be accessible through the cover plate, extend through the backing plate, such that the at least one access opening in the cover plate aligns with openings or a switch toggle provided in the accessible portions of the electrical device; and
(4) the backing plate further comprises two or more openings that are configured to provide where separate or attached backing plate connectors or retention members are configured to attach one or more of:
(a) the backing plate to the electrical device, a mounting or strapping plate, a receptacle box, and/or a receptacle box cover plate;
(b) the cover plate to both the backing plate and the electrical device; or
(c) the cover plate to the backing plate, the electrical device, the mounting or strapping plate, the receptacle box, or the receptacle box cover plate.

2. The cover plate assembly of claim 1, wherein the one or more retention members include at least one retention portion that at least partially extends into and conforms to one or more edge openings or edge ridges defined by the outer edge of the electrical device, for selectively attaching and/or engaging the back surface of the cover plate.

3. The cover plate assembly of claim 1, wherein the one or more retention members include one or more engagement surfaces that interface with one or more of the outer edges of the electrical device.

4. The cover plate assembly of claim 3, wherein the one or more engagement surfaces of the one or more retention members are at an angle relative to the first plane of the body portion of the cover plate.

5. The cover plate assembly of claim 1, wherein the one or more of the retention members include an arm portion having a first thickness, and an end portion having a second thickness greater than the first thickness; or wherein the cover plate further comprises one or more second retention members that conform to the outer edge of the electrical device, and that lie in both parallel and perpendicular planes to that of the back surface of the cover plate.

6. The cover plate assembly of claim 1, wherein the at least one access opening in the cover plate is configured to accommodate one or more selected from a light switch, a light dimmer, a light or electricity control panel or touchscreen, and sound, wifi, or infrared sensors, receivers or transmitters.

7. The cover plate assembly of claim 1, wherein the electrical device has a shape selected from round, rectangular, or square as a surface parallel to the front surface of the cover plate.

8. The cover plate assembly of claim 1, further comprising mounting holes or connectors of the mounting or strapping plate that are provided at one or more of end, side or middle portions of the mounting or strapping plate; and wherein the mounting holes or connectors are configured to align with second mounting holes or connectors of the electrical device, or the receptacle box.

9. The cover plate assembly of claim 8, wherein the mounting or strapping plate is connected to the electrical device, receptacle box, or a wall adjacent to the electrical device or receptacle box, using mounting or strapping plate screws or connectors that also connect the electrical device to the receptacle box or to the wall.

10. The cover plate assembly of claim 1, wherein a plane of a front or a back surface of the mounting or strapping plate and the first plane of the cover plate are parallel within a range of 0-10 degrees.

11. The cover plate assembly of claim 1, wherein a first surface area of the front surface of the cover plate is larger than a second surface area of a front surface of the mounting or strapping plate or the receptacle box, the first surface area of the front surface of the cover plate configured to cover any gap between an outer edge of the receptacle box and an adjacent opening in an inner edge of a wall opening adjacent to the outer edge of the receptacle box.

12. The cover plate assembly of claim 1, wherein the outer edge portions of the cover plate extend between the cover plate and an inner edge of a wall opening adjacent to an outer edge of the receptacle box to cover any gap between the outer edge portions of the cover plate edge and the inner edge of the wall opening, or for decorative utility.

13. The cover plate assembly of claim 1, wherein a shape of the outer edge portions of the cover plate is selected from rounded, curved, angled, concave, convex, raised, stepped, square, beveled, routed, etched, lined, engraved, and any combination thereof.

14. The cover plate assembly of claim 1, wherein the generally planar front surface of the cover plate is selected from one or more of dyed, colored, painted, printed, clear, transparent, clear and back painted, coated or printed, wall papered, rounded, curved, angled, concave, convex, raised, stepped, square, beveled, routed, etched, lined, engraved, and any combination thereof.

15. The cover plate assembly of claim 1, wherein the cover plate further comprises a spring mechanism and a hinge to open the cover plate to be configured to provide access to the mounting or strapping plate, the electrical device, or the receptacle box.

16. The cover plate assembly of claim 15, wherein the spring mechanism and the hinge are provided as part of a second cover plate provided over the cover plate and attached to one selected from the cover plate, the mounting or strapping plate, the receptacle box, and a wall adjacent to the electrical device or to the cover plate.

17. The cover plate assembly of claim 1, further comprising a mud ring or raised device plate provided between the cover plate and the mounting or strapping plate, wherein said mud ring or raised device plate is of a thickness that is configured to make the front surface of the cover plate flush with an exposed surface of a wall adjacent to the cover plate assembly when installed.

18. The cover plate assembly of claim 1, wherein a combined thickness of the cover plate and the mounting or strapping plate is less than one selected from ¾, ⅝, 9/16, ½, 7/16, ⅜, 5/16, ¼, ⅛, and 1/16 inches.

* * * * *